(12) United States Patent
Hashimoto (10) Patent No.: US 8,414,177 B2
(45) Date of Patent: Apr. 9, 2013

(54) PLANAR LIGHT EMITTING DEVICE

(75) Inventor: Yukinori Hashimoto, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 358 days.

(21) Appl. No.: 12/938,741

(22) Filed: Nov. 3, 2010

(65) Prior Publication Data

US 2011/0110115 A1  May 12, 2011

(30) Foreign Application Priority Data

Nov. 12, 2009  (JP) ................... 2009-258922

(51) Int. Cl.
*F21V 8/00*  (2006.01)

(52) U.S. Cl.
USPC ............................. 362/634; 362/633; 362/581

(58) Field of Classification Search .................. 362/634, 362/632, 633, 581, 511, 330, 640, 254; 349/58, 349/60
See application file for complete search history.

(56) References Cited

U.S. PATENT DOCUMENTS 7,312,838 B2 * 12/2007 Hwang et al. ................... 349/58

FOREIGN PATENT DOCUMENTS

| JP | 2007-173653 | 7/2007 |
| JP | 2007-311327 | 11/2007 |
| JP | 2008-164688 | 7/2008 |
| JP | 2008-218039 | 9/2008 |

* cited by examiner

*Primary Examiner* — Sharon Payne
(74) *Attorney, Agent, or Firm* — Young & Thompson (57) ABSTRACT

A planar light emitting device (PLED) includes: a light guide plate (LGP) having upper/lower surfaces; a light source substrate (LSS) mounted with a point light source parallel with a side end of the LGP; a first chassis covering a back of the LSS and a lower surface of the LGP in parallel; and a second chassis having an emission opening; a light source member in a side surface of the PLED; and a fixing member on the side of the PLED with an inclined portion. The inclined portion of the fixing member is formed so pressing the fixing member moves the LGP toward the LSS, which is fixed between the side end of the LGP and the first chassis. Removing the fixing member forms a gap between the LSS and the side end surface of the LGP or the first chassis, and the LSS can exit the LSS take-out portion.

6 Claims, 6 Drawing Sheets

PLANAR LIGHT EMITTING DEVICE

This application is based upon and claims the benefit of priority from Japanese patent application No. 2009-258922, filed on Nov. 12, 2009, the disclosure of which is incorporated herein in its entirety by reference.

BACKGROUND OF THE INVENTION

1. Field of the Invention

The present invention relates to a planar light emitting device, and more particularly to a planar light emitting device in which a substrate mounted with a light source is provided insertably and removably from a side surface of the device.

2. Description of the Related Art

As a light source, such as a liquid crystal backlight, a planar light emitting device is used that emits light from a point light source such as a light emitting diode in a planar shape. The planar light emitting device is configured to cause light from at least one light emitting diode to enter into one end surface of a light guide plate having a position facing main surfaces and to emit the light from the whole of one of the main surfaces of the light guide plate.

As such a planar light emitting device, for example, JP2007-311327A discloses a planar light source device including a plurality of point light sources; a light guide plate that emits incident light from the point light sources to one side surface from an emission surface; a lower case having a side surface formed substantially in parallel with an incident surface of the light guide plate; and a light source substrate on which the plurality of point light sources are placed at predetermined intervals, and that is placed on a side of the incident surface of the light guide plate, wherein a substrate holding member is provided that holds the light source substrate and the side surface of the lower case with a protrusion placed between the two point light sources.

Generally, a planar light emitting device has a structure in which a light source substrate mounted with a light source can be attached or detached so that a light source that fails can be easily replaced. JP2007-311327A discloses a structure in which the light source substrate is inserted into and removed from the side surface of the planar light emitting device. However, in JP2007-311327A, a screw or a substrate holding member needs to be removed from an upper surface or a lower surface to remove the light source substrate. For this purpose, a display device or a machine to which the planar light emitting device is mounted needs to be disassembled so that the upper surface or the lower surface is visible, which requires a large number of steps for removing the light source substrate.

JP2007-311327A also discloses a structure without a screw for fixing the light source substrate or a substrate holding member, but this structure requires clearance for removing the light source substrate, and the clearance reduces heat dissipation to the lower case (rear sheet metal) as compared with the structure in which the light source substrate is fixed to the lower case. Thus, heat generated by light emission is not released to increase the temperature of the point light source and therearound to reduce the reliability (life) and brightness of the point light source.

SUMMARY OF THE INVENTION

The present invention is intended to solve the above described problems and its main object is to provide a planar light emitting device in which a light source substrate can be easily replaced.

Another object of the present invention is to provide a planar light emitting device that can improve heat dissipation of a point light source and achieve high reliability (long life) and high brightness of the light source substrate.

To achieve the above-described object, the present invention provides a planar light emitting device comprising: a light guide plate having an upper surface and a lower surface facing each other; a reflective sheet placed on a lower surface of the light guide plate; a point light source having at least one light emitting element and provided so that light from the light emitting element enters into a side end surface of the light guide plate; a light source substrate mounted with the point light source and placed substantially in parallel with the side end surface of the light guide plate; a first chassis that covers at least a back surface of the light source substrate and a lower surface of the light guide plate substantially in parallel; a second chassis having an emission opening for planar emission placed in the upper surface of the light guide plate and mating with the first chassis; a light source substrate take-out portion provided in a side surface of the planar light emitting device for removing the light source substrate along the side end surface of the light guide plate; and a fixing member provided on the side surface of the planar light emitting device and having an inclined portion inclined with respect to a longitudinal direction of the side end surface of the light guide plate, wherein the inclined portion of the fixing member is formed so that when the fixing member is pressed inside from outside the planar light emitting device, the light guide plate moves closer to the light source substrate, and the light source substrate is held and fixed between the side end surface of the light guide plate and the first chassis; and so that when the fixing member is removed from the side surface of the planar light emitting device, a gap is created between the light source substrate and the side end surface of the light guide plate or the first chassis, and the light source substrate can be taken out of the light source substrate take-out portion of the planar light emitting device.

The present invention also provides a planar light emitting device comprising: a light guide plate having an upper surface and a lower surface facing each other; a reflective sheet placed on a lower surface of the light guide plate; a point light source having at least one light emitting element and provided so that light from the light emitting element enters into a side end surface of the light guide plate; a light source substrate mounted with the point light source and placed in parallel with the side end surface of the light guide plate; a first chassis that covers at least a back surface of the light source substrate and a lower surface of the light guide plate in parallel; a second chassis having an emission opening for planar emission placed in the upper surface of the light guide plate and mating with the first chassis; a light source substrate take-out portion provided in a side surface of the planar light emitting device for taking out the light source substrate along the side end surface of the light guide plate; a screw member provided in the side surface of the planar light emitting device and threaded into a threaded hole provided in the light guide plate through the second chassis; and inclined portions inclined with respect to a longitudinal direction of the side end surface of the light guide plate provided in corresponding positions on the light guide plate and the second chassis, wherein the inclined portions of the light guide plate and the second chassis are formed so that when the screw member is fastened in the threaded hole, the light guide plate is drawn toward the second chassis, the light guide plate moves closer to the light source substrate, and the light source substrate is held and fixed between the side end surface of the light guide plate and the first chassis; and so that when the screw member is loosened from the threaded hole, a gap is created between the light source substrate and the side end surface of the light guide plate or the first chassis, and the light source substrate can be taken out of the light source substrate take-out portion of the planar light emitting device.

The planar light emitting device of the present invention provides advantages described below.

The present invention has a first advantage in which the light source substrate can be easily replaced. This is because when the fixing member is inserted or the screw is threaded, the inclined portion provided in the fixing member, the light guide plate, or the chassis causes the light guide plate to move closer to the light source substrate, and the light source substrate is held and fixed between the end surface of the light guide plate and the chassis. Also, this is because the fixing member or the screw is removed, and thus a gap is created between the light source substrate and the end surface of the light guide plate or the chassis, thereby allowing the light source substrate to be taken out of a take-out portion of the planar light emitting device.

The present invention has a second advantage that heat dissipation of the point light source can be improved and high reliability (long life) and high brightness of the light source substrate can be achieved. This is because the light source substrate is brought into tight contact with the chassis with the fixing member or the screw being mounted, and heat generated from the point light source can be efficiently dissipated to the outside via the light source substrate and the chassis.

The above and other objects, features and advantages of the present invention will become apparent from the following description with reference to the accompanying drawings which illustrate examples of the present invention.

DETAILED DESCRIPTION OF THE PREFERRED EMBODIMENT

As described in the background art, a planar light emitting device has a structure in which a light source substrate can be attached and detached so that a point light source that fails can be replaced, and JP2007-311327A discloses a structure in which a light source substrate is inserted into and removed from a side surface of a planar light emitting device. However, with this structure, a display device itself to which the planar light emitting device is mounted needs to be disassembled to remove the light source substrate, which requires a large number of steps for removing the light source substrate.

JP2007-311327A also discloses a structure without a screw for fixing the light source substrate or a substrate holding member, but with this structure, the clearance between the light source substrate and a lower case reduces heat dissipation. Thus, heat generated by light emission increases the temperature of the light source and therearound to reduce the reliability (life) and brightness of the light source. In particular, when the brightness of a display screen is to be increased in the planar light emitting device, the number of light emitting elements is increased to increase the density of the elements, or current supplied to each point light source is increased to increase the emitted luminous flux, but in either case, heat is greatly generated by light emission to significantly reduce reliability (life) and brightness of the light source.

Thus, in an exemplary embodiment, a side light type planar light emitting device using a light source substrate mounted with a point light source such as a light emitting diode, as a light source, adopts a structure in which a lower chassis that covers a back surface of the light source substrate mounted with the point light source and a lower surface of the light guide plate substantially in parallel, and an upper chassis that mates with the lower chassis are provided; a light source substrate take-out portion for taking out the light source substrate along an incident end surface of the light guide plate is provided on a side surface of the device; and an inclined portion inclined with respect to a longitudinal direction of the incident end surface of the light guide plate is provided in the light guide plate, in a fixing member that fixes the light guide plate, in the upper chassis that covers the side surface except for the incident end surface of the light guide plate, or the like. In this structure, the fixing member or a screw is inserted from the side surface of the planar light emitting device, and the inclined portion causes the light guide plate to move closer to the light source substrate, and thus the light source substrate is brought into tight contact with and fixed to the lower chassis.

Thus, the light source substrate can be easily replaced only by an operation from the side surface, thereby reducing the number of steps for removing the light source substrate. The light source substrate is brought into tight contact with the lower chassis, and thus heat generated by light emission of the point light source can be efficiently dissipated to the outside, thereby improving the reliability (life) and brightness of the point light source.

(Exemplary Embodiment 1)

Figure 1A:
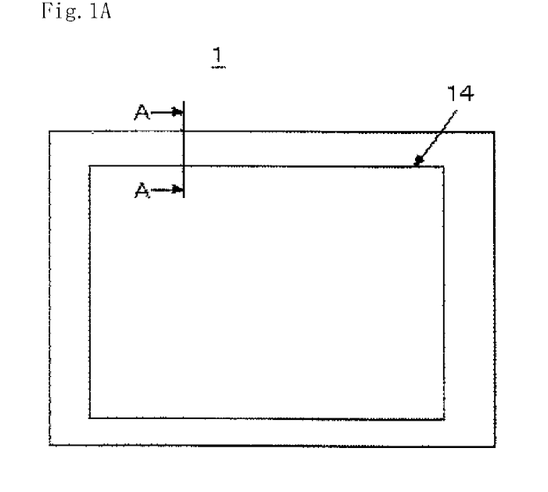
FIG. 1A is a front view showing a configuration of a planar light emitting device according to a first exemplary embodiment.
Figure 1B:
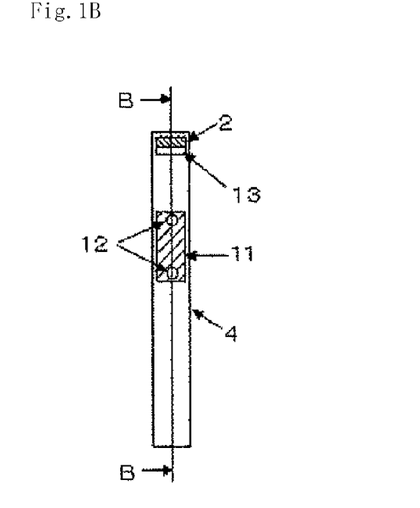
FIG. 1B is a side view showing the configuration of the planar light emitting device according to the first exemplary embodiment.
Figure 2A:
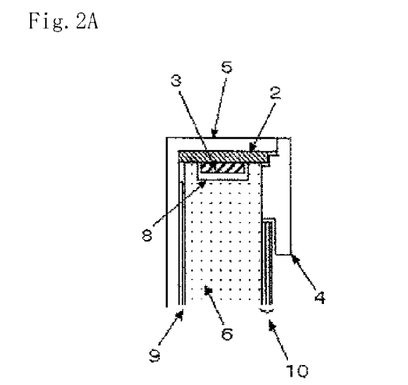
FIGS. 2A to 2C are cross-sectional views showing a light source substrate and therearound taken along the line A-A in FIG. 1.
Figure 2B:
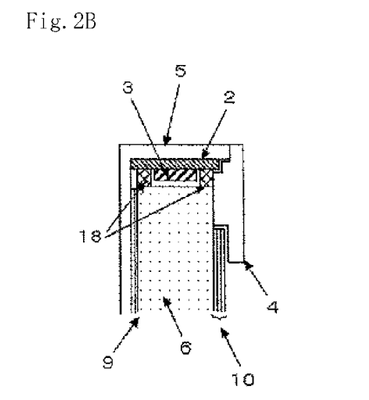
Figure 2C:
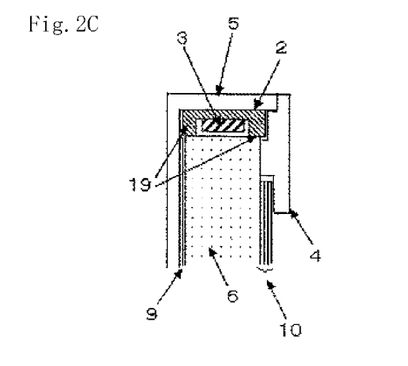
Figure 3:
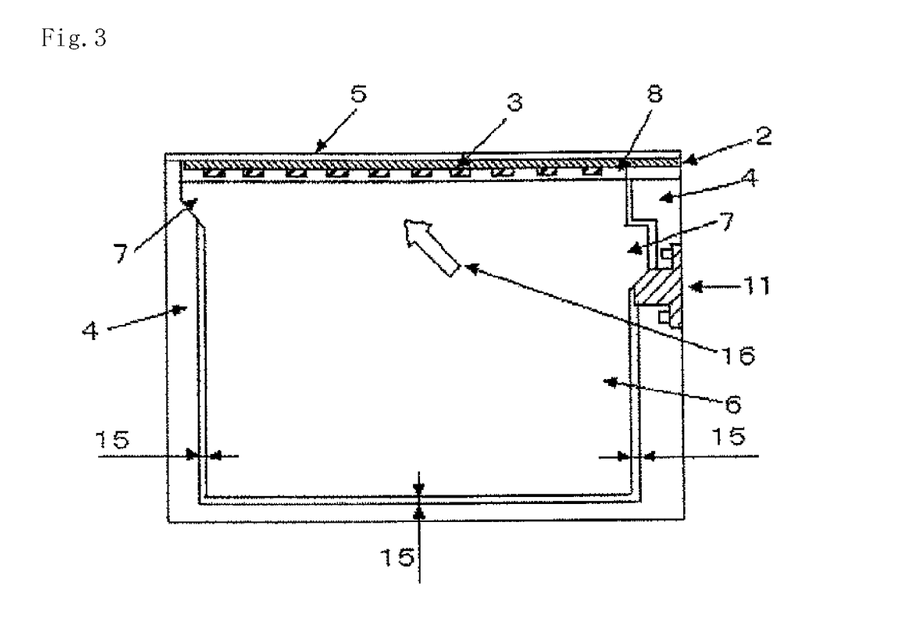
FIG. 3 is a cross-sectional view showing a detailed structure taken along the line B-B in FIG. 1.
Figure 4:
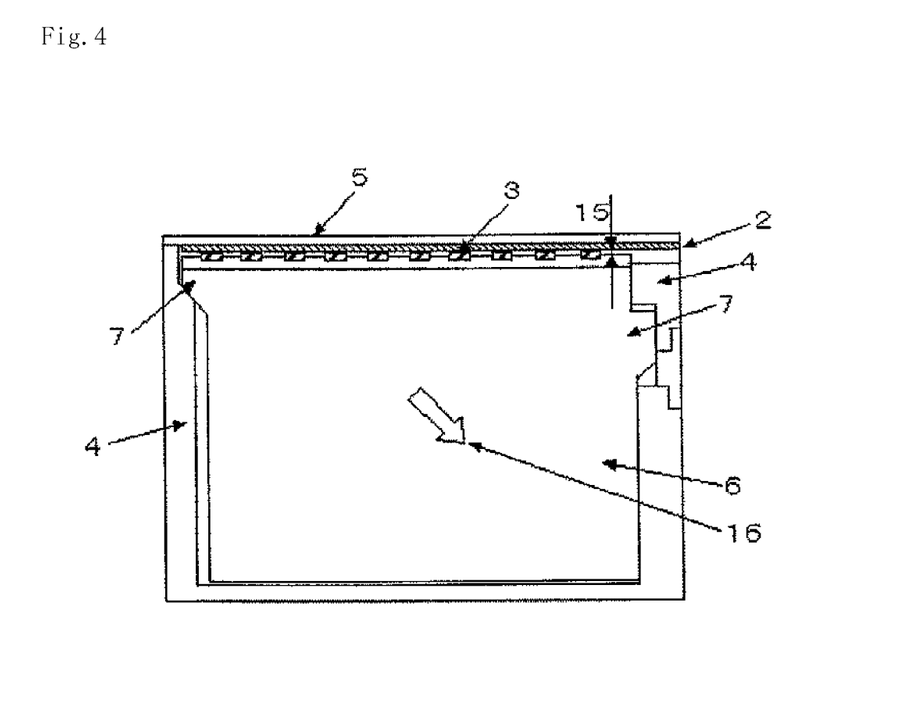
FIG. 4 is a cross-sectional view showing a detailed structure (with a light guide plate fixing member being removed) taken along the line B-B in FIG. 1.

To describe the above-described exemplary embodiment in more detail, a planar light emitting device according to a first exemplary embodiment will be described with reference to FIGS. 1 to 4. FIGS. 1A and 1B are a front view and a side view showing a configuration of the planar light emitting device of this exemplary embodiment. FIGS. 2A to 2C are cross-sectional views showing a detailed structure taken along the line A-A in FIG. 1A, and FIGS. 3 and 4 are cross-sectional views showing a detailed structure taken along the line B-B in FIG. 1B.

As shown in FIGS. 1 to 4, planar light emitting device 1 of this exemplary embodiment includes point light source 3, a substrate (referred to as light source substrate 2) mounted with point light source 3, light guide plate 6 that emits light emitted from point light source 3 in a planar shape, reflective sheet 9 and optical sheet 10, a housing (upper chassis 4 and lower chassis 5) that houses these members, or the like.

Planar light emitting device 1 has emission opening 14 in a front surface and light source substrate take-out hole 13 in a side surface. On the side surface, light guide plate fixing member 11 is fixed to upper chassis 4 by screw 12 or the like. Light source substrate take-out hole 13 may be provided in upper chassis 4 or lower chassis 5 (upper chassis 4 in this exemplary embodiment), or may be a gap between upper chassis 4 and lower chassis 5.

FIG. 2A is a cross-sectional view of a light source and therearound of planar light emitting device 1 according to this exemplary embodiment. Point light source 3 uses at least one light emitting element, such as a light emitting diode, and the light emitting element is directly connected to light source substrate 2, or mounted in a resin or ceramic package and then connected to light source substrate 2. Then, light source substrate 2 to which point light source 3 is connected is placed substantially in parallel with an incident end surface of light guide plate 6. Light guide plate 6 is in contact with light source substrate 2 except light guide plate recess 8, and light guide plate recess 8 prevents contact between light guide plate 6 and point light source 3. Reflective sheet 9 is placed on a lower surface of light guide plate 6, and optical sheet 10 is placed on an upper surface of light guide plate 6. Reflective sheet 9 and optical sheet 10 are held between upper chassis 4 and lower chassis 5. Upper chassis 4 and lower chassis 5 are fixed by mating using a screw or a protrusion and a recess.

As described above, light source substrate 2 is brought into tight contact with and fixed to lower chassis 5 using light guide plate 6. When lower chassis 5 is insufficiently brought into tight contact with light source substrate 2, a nonadhesive material such as silicone grease may be interposed.

FIG. 3 is a cross-sectional view substantially in the middle in a thickness direction of planar light emitting device 1. With light guide plate fixing member 11 being inserted, light guide plate protrusion 7 is in contact with upper chassis 4 on an upper left side in FIG. 3, light guide plate protrusion 7 is in contact with light guide plate fixing member 11 on a right side in FIG. 3, and a part of the upper surface of light guide plate 6 except light guide plate recess 8 is in contact with light source substrate 2 on an upper side in FIG. 3. Between light guide plate 6 and upper chassis 4, gaps 15 are provided in a lower part and in the left and right parts in FIG. 3.

The above-described configuration is an example of planar light emitting device 1 of this exemplary embodiment, and the shape, size, structure, and material thereof can be set as appropriate.

For example, in the exemplary embodiment shown in FIG. 2A, light guide plate recess 8 is provided in the incident end surface of light guide plate 6 to prevent contact between light guide plate 6 and point light source 3, but as shown in FIG. 2B, light source substrate fixing member 18 or the like may be placed between light guide plate 6 and light source substrate 2. Light source substrate fixing member 18 may be made of resin such as acrylic, polycarbonate or polyethylene terephthalate, or metal such as aluminum, and may be fixed to either light guide plate 6 or light source substrate 2. As shown in FIG. 2C, light source substrate protrusion 19 protruding toward the incident end surface of light guide plate 6 may be provided on light source substrate 2.

In FIG. 3, inclined surfaces inclined at the same angle are provided in light guide plate protrusion 7 and a tip of light guide plate fixing member 11, but one may have an inclined surface and the other may have a protrusion that abuts against the inclined surface and slides.

Light source substrate 2 may be made of a resin material such as glass epoxy resin, or a metal material such as aluminum or copper, but a metal material such as aluminum is desirable in view of thermal conductivity.

Upper chassis 4 and lower chassis 5 may be made of either a resin material or a metal material, but lower chassis 5 is desirably formed of a metal member such as aluminum in view of thermal conductivity.

Light guide plate 6 may be formed of a transparent member of acrylic or polycarbonate, and an internal scattering material may be mixed. Surfaces in contact with reflective sheet 9 and optical sheet 10 are subjected to dot printing, blasting, dot forming, grooving, lens machining, mirror surface machining, or the like, so that light which enters into the end surface of the light guide plate from point light source 3 is uniformly emitted from emission opening 14 formed by the machining.

Light guide plate fixing member 11 may be made of a resin material, a metal material such as aluminum or copper, or an elastic material. Light guide plate fixing member 11 may be fixed to either upper chassis 4 or lower chassis 5, and light guide plate fixing member 11 may be fixed not only by mating using screw 12 but also by mating using a protrusion or the like.

Next, an operation of planar light emitting device 1 having the above-described configuration will be described with reference to FIGS. 3 and 4.

Planar light emitting device 1 has a structure in which light guide plate fixing member 11 fixed to the side surface of planar light emitting device 1 fixes light guide plate 6, and light guide plate 6 presses light source substrate 2 and thus light source substrate 2 is held and fixed between light guide plate 6 and lower chassis 5. Specifically, as shown in FIG. 3, light guide plate fixing member 11 is in contact with light guide plate protrusion 7, and the contact portion is inclined to press light guide plate 6 obliquely upward (light guide plate moving direction 16 in FIG. 3). Light guide plate 6 is also inclined at light guide plate protrusion 7 on the opposite side that is not in contact with light guide plate fixing member 11, and thus light guide plate 6 is pressed obliquely upward laterally equally. Thus, light guide plate 6 presses light source substrate 2 at portions except light guide plate recess 8, and lower chassis 5 is in contact with the back surface of light source substrate 2, and thus light source substrate 2 is fixed by light guide plate 6 and lower chassis 5.

When point light source 3 is electrified, the light emitting element generates light and heat. The light is emitted from emission opening 14 through light guide plate 6 and optical sheet 10. The heat is transferred to peripheral members by radiation, conduction, or transmission, but is transferred to the back surface of light source substrate 2 mainly by conduction or transmission. In the above-described state, lower chassis 5 is in tight contact with light source substrate 2, and thus heat transmitted to the back surface of light source substrate 2 is quickly transmitted to lower chassis 5 and conducted to entire lower chassis 5. Since lower chassis 5 is in contact with the atmosphere, the heat conducted to entire lower chassis 5 is dissipated to the atmosphere.

When a failure occurs in point light source 3 or light source substrate 2, screw 12 (FIG. 1B) is removed to remove guide plate fixing member 11, and then the force for pressing light guide plate 6 is eliminated, and thus light guide plate 6 moves in the space created by gap 15 provided between light guide plate 6 and upper chassis 4. FIG. 4 shows light guide plate fixing member 11 being removed. When light guide plate 6 moves obliquely right downward (light guide plate moving direction 16 in FIG. 4), light guide plate 6 no longer presses light source substrate 2, and light source substrate 2 can move in the space created by gap 15 in FIG. 4. Thus, light source substrate 2 can be taken out of light source substrate take-out hole 13 provided in the side surface of planar light emitting device 1.

Then, new light source substrate 2 is inserted through light source substrate take-out hole 13, light guide plate fixing member 11 is inserted from the side surface of planar light emitting device 1 and fixed by screw 12, and then planar light emitting device 1 is returned to a fixed state in FIG. 3. Specifically, new light source substrate 2 is held and fixed between lower chassis 5 and light guide plate 6 to maintain tight contact between lower chassis 5 and light source substrate 2.

As such, light guide plate fixing member 11 placed in the side surface of planar light emitting device 1 can be simply removed to remove light source substrate 2, and thus light source substrate 2 can be easily replaced without performing an operation from a front surface or a back surface of the planar light emitting device as in the conventional technique.

The light emitting diode, as the light emitting element of point light source 3, generates light and heat when electrified, but the excessively increased temperature of the light emitting element reduces light emitting efficiency and lighting life. Thus, a structure having good heat dissipation is required such that the temperature of the light emitting element is not increased even if the density of light emitting elements is increased or even if a high current is passed. Heat dissipation to the atmosphere, without using a method such as solvent cooling or boiling cooling, requires ensuring a heat dissipation area depending on the amount of heat and on quick temperature transfer from a heat source to a heat dissipation part.

To satisfy this demand, in this exemplary embodiment, light source substrate 2 is made of metal having high thermal conductivity, and thus heat from the light emitting element is quickly transferred to the back surface of light source substrate 2, and is further transferred to lower chassis 5 in tight contact with the back surface of light source substrate 2. Lower chassis 5 is made of metal having high thermal conductivity, and thus heat can be dissipated from a large area of the back surface of planar light emitting device 1, and heat generated from point light source 3 can be efficiently dissipated from lower chassis 5 to the atmosphere. This can prevent an increase in the temperature of the light emitting element, provide higher light emitting efficiency and longer lighting life, and achieve a planar light emitting device having high brightness and high reliability.

(Exemplary Embodiment 2)

Figure 5A:
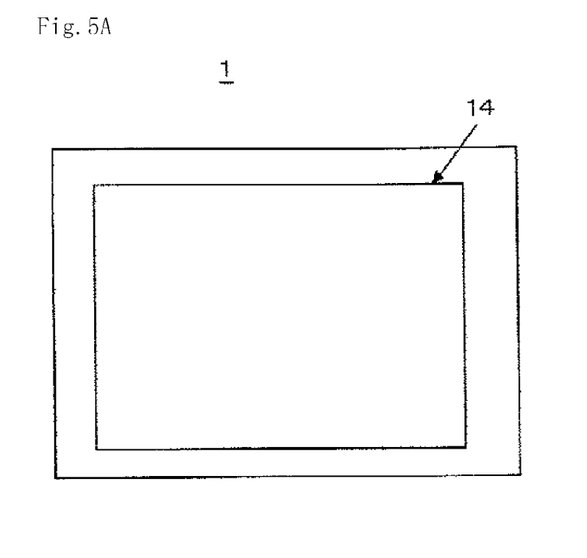
FIG. 5A is a front view showing a configuration of a planar light emitting device according to a second exemplary embodiment.
Figure 5B:
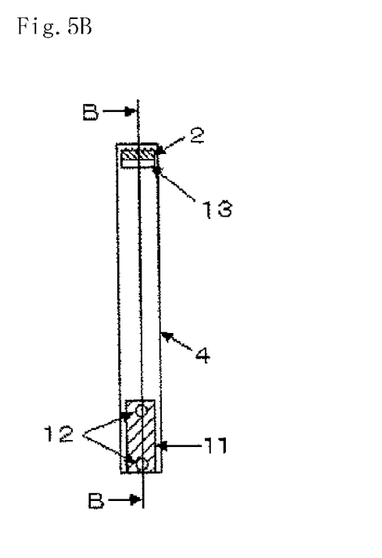
FIG. 5B is a side view showing the configuration of the planar light emitting device according to the second exemplary embodiment.

Next, a planar light emitting device according to a second exemplary embodiment will be described with reference to FIGS. 5 to 7. FIGS. 5A and 5B are a front view and a side view showing a configuration of a planar light emitting device of this exemplary embodiment, and FIGS. 6 and 7 are cross-sectional views showing a detailed structure taken along the line B-B in FIG. 5B.

Planar light emitting device 1 of the first exemplary embodiment described above has the structure in which light guide plate fixing member 11 presses the side surface of light guide plate 6, while planar light emitting device 1 of this exemplary embodiment has a structure in which light guide plate fixing member 11 presses a lower surface (surface on the side opposite to light source substrate 2) of light guide plate 6.

Figure 6:
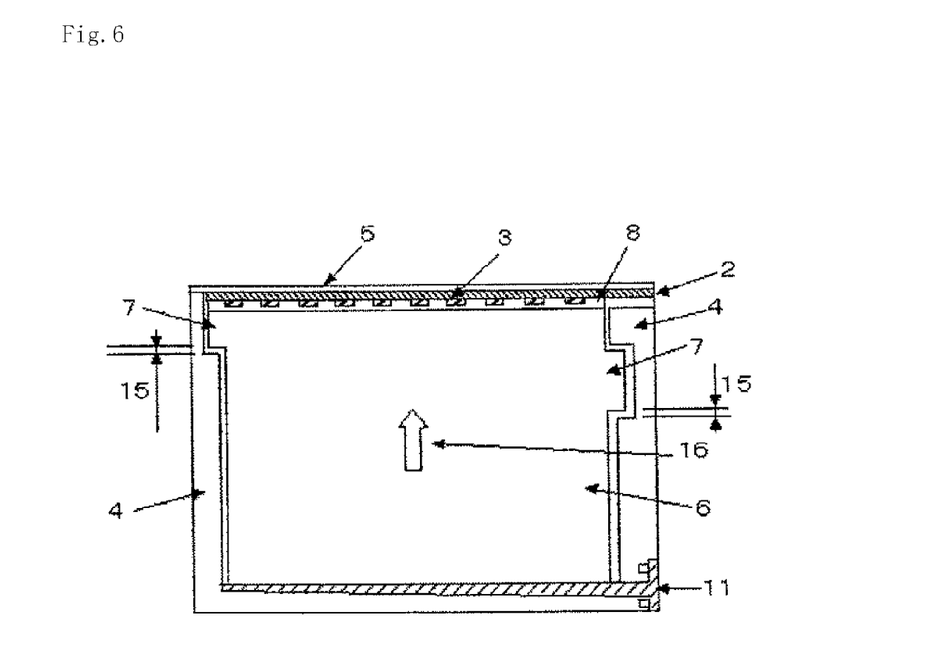
FIG. 6 is a cross-sectional view showing a detailed structure taken along the line B-B in FIG. 5B.
Figure 7:
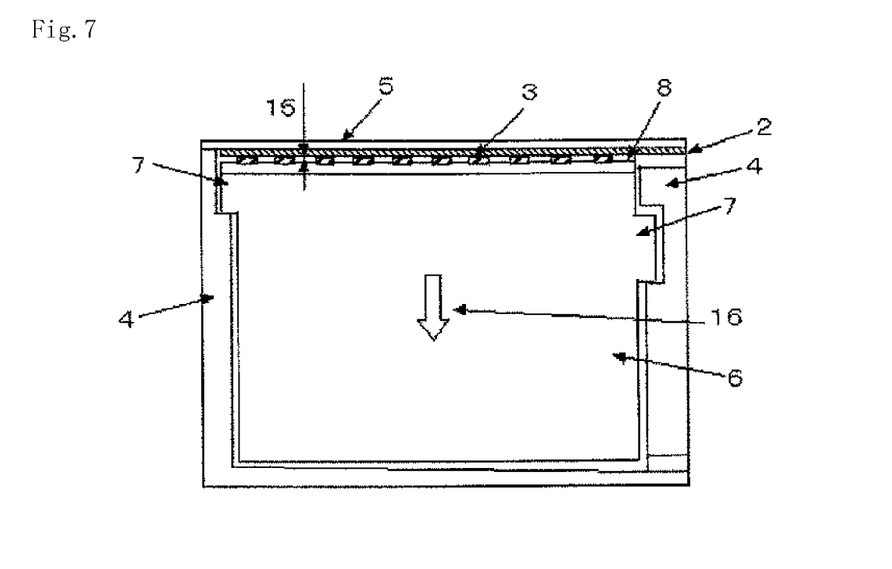
FIG. 7 is a cross-sectional view showing a detailed structure (with a light guide plate fixing member being removed) taken along the line B-B in FIG. 5B.

Specifically, as shown in FIGS. 5 and 6, light guide plate fixing member 11 is in contact with the lower side of light guide plate 6 rather than light guide plate protrusion 7, and the space between a portion that comes in contact with the lower side of light guide plate 6 of light guide plate fixing member 11 and a portion that comes in contact with upper chassis 4 of light guide plate fixing member 11 is gradually tapered to have the shape of a tip. A lower side of upper chassis 4 is inclined to mate with an inclined surface of light guide plate fixing member 11.

Planar light emitting device 1 shown in FIG. 6 has a structure in which, with light guide plate fixing member 11 being fixed, light guide plate fixing member 11 is in contact with the entire lower side of light guide plate 6, but light guide plate fixing member 11 may be in contact with at least a part of the lower side of light guide plate 6. In the planar light emitting device shown in FIG. 6, portions of light guide plate fixing member 11 in contact with the lower side of light guide plate 6 and in contact with upper chassis 4 each have a linear shape, but for example, a portion of light guide plate fixing member 11 in contact with upper chassis 4 may be curved. In planar light emitting device 1 shown in FIG. 6, the portion of light guide plate fixing member 11 in contact with upper chassis 4 is inclined, but a portion of light guide plate fixing member 11 in contact with the lower side of light guide plate 6 may be inclined, and in this case, the lower side of light guide plate 6 may be inclined.

An operation of planar light emitting device 1 having the above-described configuration will be described with reference to FIGS. 6 and 7.

As shown in FIG. 6, light guide plate fixing member 11 is in contact with the lower side of light guide plate 6 and upper chassis 4, and the portion of light guide plate fixing member 11 in contact with upper chassis 4 is inclined. Thus, when light guide plate fixing member 11 is inserted, light guide plate fixing member 11 presses light guide plate 6 upward (light guide plate moving direction 16 in FIG. 6). Thus, light guide plate 6 presses light source substrate 2 at portions except light guide plate recess 8. Lower chassis 5 is in contact with the back surface of light source substrate 2, and thus light source substrate 2 is fixed by light guide plate 6 and lower chassis 5.

Meanwhile, when light guide plate fixing member 11 is removed, the force for pressing light guide plate 6 is eliminated, and thus as shown in FIG. 7, light guide plate 6 moves downward in FIG. 7 in the space created by gap 15 provided between left and right light guide plate protrusions 7 and upper chassis 4. Thus, light source substrate 2 can be taken out of light source substrate take-out hole 13 provided in the side surface of planar light emitting device 1.

Then, new light source substrate 2 is inserted through light source substrate take-out hole 13, light guide plate fixing member 11 is inserted from the side surface of planar light emitting device 1 and fixed by screw 12, and then light guide plate 6 moves upward. Thus, new light source substrate 2 is held and fixed between lower chassis 5 and light guide plate 6 to maintain tight contact between lower chassis 5 and light source substrate 2.

As such, with the structure of this exemplary embodiment, as in the first exemplary embodiment, light guide plate fixing member 11 placed in the side surface of planar light emitting device 1 can be simply removed to remove light source substrate 2, and thus light source substrate 2 can be easily replaced without performing an operation from a front surface or a back surface of the planar light emitting device as in the conventional technique.

Since heat from the light emitting element is transferred via the back surface of light source substrate 2 to lower chassis 5, and is further dissipated from a large area of the back surface of planar light emitting device 1, heat generated from point light source 3 can be efficiently dissipated from lower chassis 5 to the atmosphere. This can prevent an increase in the temperature of the light emitting element, provide higher light emitting efficiency and longer lighting life, and achieve a planar light emitting device having high brightness and high reliability.

(Exemplary Embodiment 3)

Figure 8A:
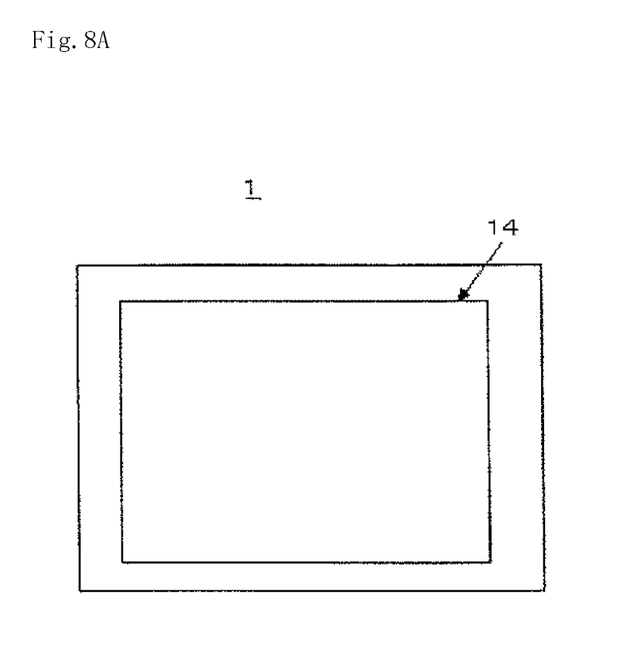
FIG. 8A is a front view showing a configuration of a planar light emitting device according to a third exemplary embodiment.
Figure 8B:
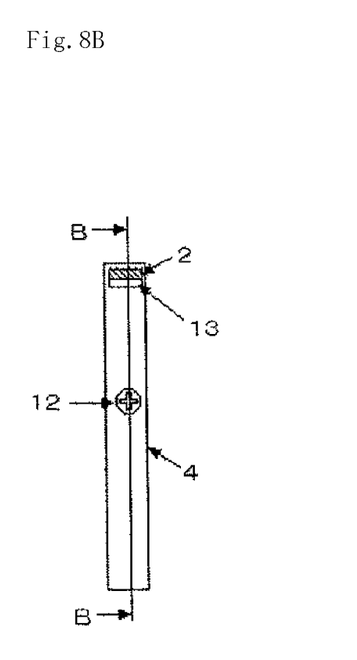
FIG. 8B is a side view showing the configuration of the planar light emitting device according to the third exemplary embodiment.

Next, a planar light emitting device according to a third exemplary embodiment will be described with reference to FIGS. 8 and 9. FIGS. 8A and 8B are a front view and a side view showing the configuration of a planar light emitting device of this exemplary embodiment, and FIG. 9 is a cross-sectional view showing a detailed structure taken along the line B-B in FIG. 8B.

The difference from the first exemplary embodiment is in the mounting method and the shape of light guide plate fixing member 11. Specifically, the planar light emitting device of the first exemplary embodiment has a structure in which light guide plate fixing member 11 is mounted from outside the planar light emitting device, while in this exemplary embodiment, as shown in FIGS. 8 and 9, light guide plate fixing member 11 is fixed to upper chassis 4 by screw 12 included in upper chassis 4.

The operation of planar light emitting device 1 having the above-described configuration will be described with reference to FIG. 9.

Figure 9:
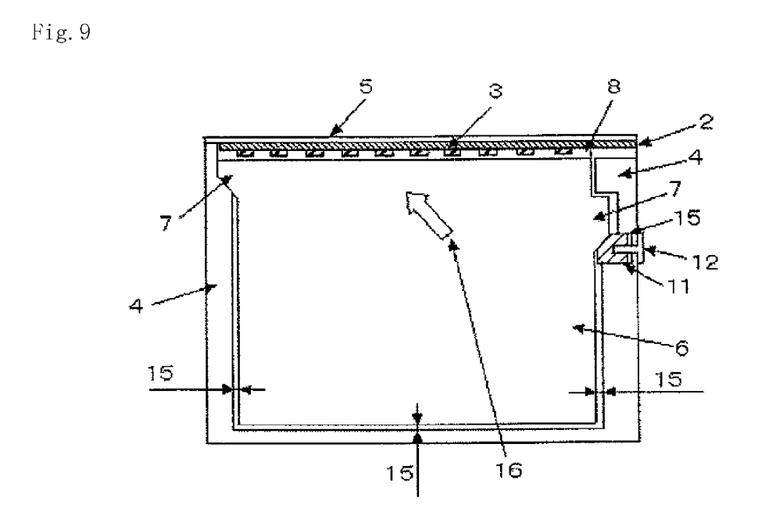
FIG. 9 is a cross-sectional view showing a detailed structure taken along the line B-B in FIG. 8B.

In the first exemplary embodiment, light guide plate fixing member 11 is inserted to press light guide plate 6 obliquely upward, while in this exemplary embodiment, as shown in FIG. 9, the depth of the threaded hole in light guide plate fixing member 11 is shallower than the depth of the threaded part of screw 12. Thus, when screw 12 is fastened, screw 12 first abuts against the bottom of the threaded hole in light guide plate fixing member 11. When screw 12 is further fastened, light guide plate fixing member 11 is pressed toward light guide plate 6, and thus light guide plate 6 is pressed obliquely upward. When screw 12 is completely fastened, light guide plate 6 and light source substrate 2 are fixed. Thus, light guide plate 6 presses light source substrate 2 at portions except light guide plate recess 8. Lower chassis 5 is in contact with the back surface of light source substrate 2, and thus light source substrate 2 is fixed by light guide plate 6 and lower chassis 5. It is permissible that the threaded hole in light guide plate fixing member 11 is not provided, and light guide plate fixing member 11 is simply pressed by screw 12.

Meanwhile, when screw 12 is removed, the force for pressing light guide plate 6 is eliminated, and thus light guide plate fixing member 11 moves in the space created by gap 15 provided next to light guide plate fixing member 11. Thus, light source substrate 2 can be taken out of light source substrate take-out hole 13 provided in the side surface of planar light emitting device 1.

As such, with the structure of this exemplary embodiment, as in the first exemplary embodiment, light guide plate fixing member 11 placed in the side surface of planar light emitting device 1 can be simply removed to remove light source substrate 2, and thus light source substrate 2 can be easily replaced without performing an operation from a front surface or a back surface of the planar light emitting device as in the conventional technique.

Since heat from the light emitting element is transferred via the back surface of the substrate to lower chassis 5, and is further dissipated from a large area of the back surface of planar light emitting device 1, heat generated from point light source 3 can be efficiently dissipated from lower chassis 5 to the atmosphere. This can prevent an increase in the temperature of the light emitting element, provide higher light emitting efficiency and longer lighting life, and achieve a planar light emitting device having high brightness and high reliability.

(Exemplary Embodiment 4)

Figure 10A:
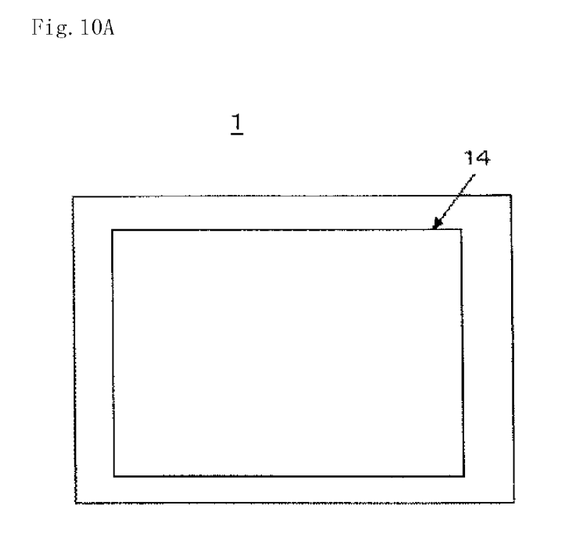
FIG. 10A is a front view showing a configuration of a planar light emitting device according to a fourth exemplary embodiment.
Figure 10B:
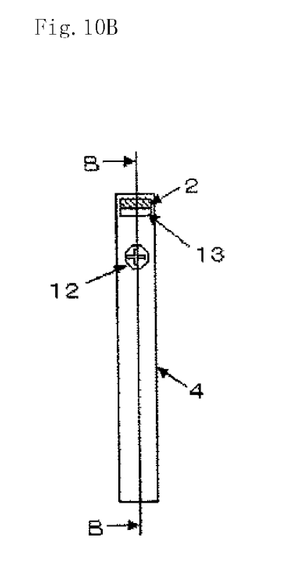
FIG. 10B is a side view showing the configuration of the planar light emitting device according to the fourth exemplary embodiment.

Next, a planar light emitting device according to a fourth exemplary embodiment will be described with reference to FIGS. 10 to 12. FIGS. 10A and 10B are a front view and a side view showing a configuration of a planar light emitting device of this exemplary embodiment, and FIGS. 11 and 12 are cross-sectional views showing a detailed structure taken along the line B-B in FIG. 10B.

Figure 11:
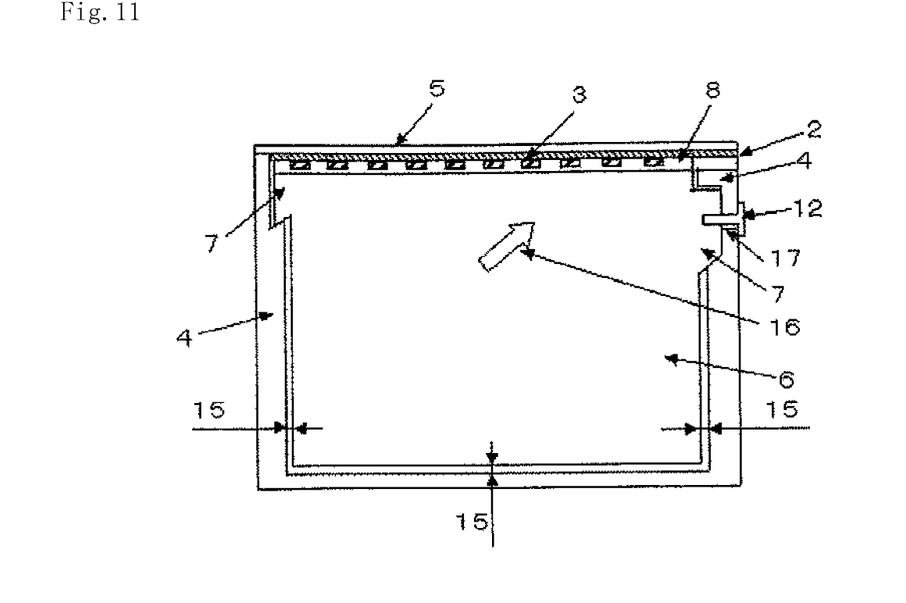
FIG. 11 is a cross-sectional view showing a detailed structure taken along the line B-B in FIG. 10B.
Figure 12:
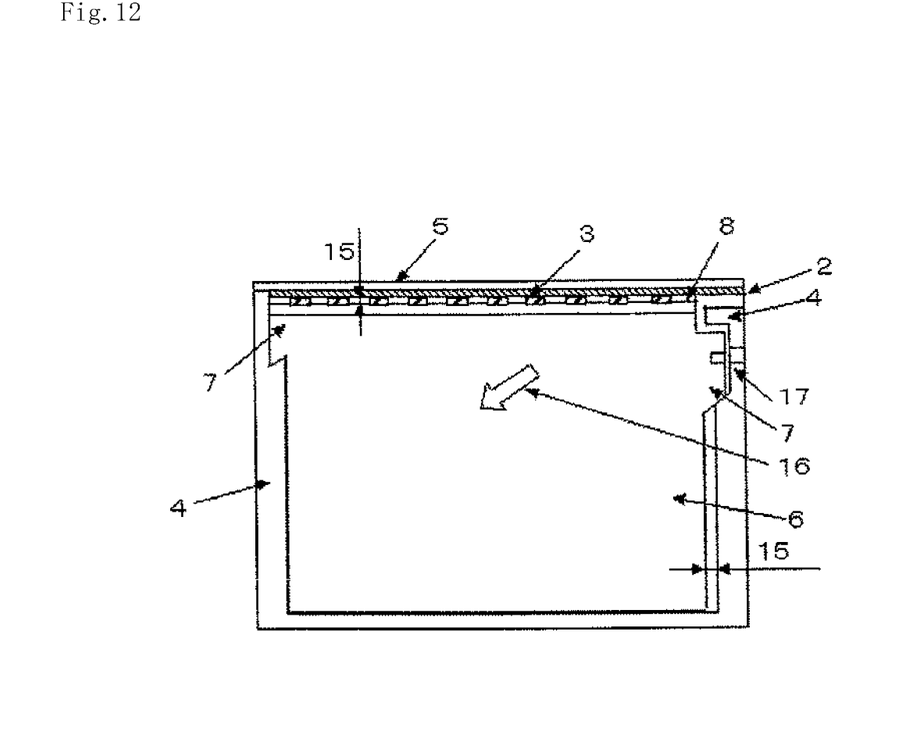
FIG. 12 is a cross-sectional view showing a detailed structure (with a screw being removed) taken along the line B-B in FIG. 10B.

In the first to third exemplary embodiments, light guide plate fixing member 11 is used, but in this exemplary embodiment, light guide plate fixing member 11 is not used, but as shown in FIGS. 10 and 11, light guide plate 6 and light source substrate 2 are fixed only by screw 12.

An operation of planar light emitting device 1 having the above-described configuration will be described with reference to FIGS. 11 and 12.

Threaded hole 17 in an upper chassis has an oval shape so that screw 12 can be fastened even when misaligned with the threaded hole in light guide plate 6. Then, as shown in FIG. 11, when screw 12 is fastened from the side surface, light guide plate 6 is drawn and pressed obliquely upward by inclined surfaces of left and right light guide plate protrusions 7, and thus light source substrate 2 is fixed by light guide plate 6.

Meanwhile, as shown in FIG. 12, when screw 12 is removed, light guide plate 6 moves downward along the inclined surface provided in light guide plate protrusion 7 to create gap 15 between light source substrate 2 and light guide plate 6, thereby allowing light source substrate 2 to be removed.

As such, with the structure of this exemplary embodiment, as in the first exemplary embodiment, screw 12 placed in the side surface of planar light emitting device 1 can be simply removed to remove light source substrate 2, and thus light source substrate 2 can be easily replaced without performing an operation from a front surface or a back surface of the planar light emitting device as in the conventional technique.

Since heat from the light emitting element is transferred via the back surface of the substrate to lower chassis 5, and further dissipated from a large area of the back surface of planar light emitting device 1, heat generated from point light source 3 can be efficiently dissipated from lower chassis 5 to the atmosphere. This can prevent an increase in the temperature of the light emitting element, provide higher light emitting efficiency and longer lighting life, and achieve a planar light emitting device having high brightness and high reliability.

The present invention is not limited to the descriptions of the above-described exemplary embodiments, but the configuration thereof may be changed without departing from the gist of the present invention. For example, in the exemplary embodiments, light source substrate take-out hole 13 and light guide plate fixing member 11 or screw 12 are placed in the same side surface of planar light emitting device 1, but may be placed in positions facing side surfaces of planar light emitting device 1, or light guide plate fixing member 11 or screw 12 may be placed in positions facing light source substrate 2.

An application of the present invention includes a planar light emitting device used in a backlight placed behind a liquid crystal, an indication light, or a planar light emitting switch.

While preferred embodiments of the present invention have been described using specific terms, such description is for illustrative purposes only, and it is to be understood that changes and variations may be made without departing from the spirit or scope of the following claims.

What is claimed is:

1. A planar light emitting device comprising:
    a light guide plate having an upper surface and a lower surface facing each other;
    a reflective sheet placed on a lower surface of said light guide plate;
    a point light source having at least one light emitting element and provided so that light from the light emitting element enters into a side end surface of said light guide plate;
    a light source substrate mounted with said point light source and placed in parallel with the side end surface of said light guide plate;
    a first chassis that covers at least a back surface of said light source substrate and a lower surface of said light guide plate in parallel;
    a second chassis having an emission opening for planar emission placed in the upper surface of said light guide plate and mating with said first chassis;
    a light source substrate take-out portion provided in a side surface of said planar light emitting device for taking out said light source substrate along the side end surface of said light guide plate; and
    a fixing member provided on the side surface of said planar light emitting device and having an inclined portion inclined with respect to a longitudinal direction of the side end surface of said light guide plate,
    wherein the inclined portion of said fixing member is formed so that when said fixing member is pressed inside from outside said planar light emitting device, said light guide plate moves closer to said light source substrate, and said light source substrate is held and fixed between the side end surface of the light guide plate and the first chassis; and so that when the fixing member is removed from the side surface of said planar light emitting device, a gap is created between said light source substrate and the side end surface of said light guide plate or said first chassis, and said light source substrate can be taken out of said light source substrate take-out portion.

2. The planar light emitting device according to claim 1, wherein said light guide plate has a protrusion that abuts against the inclined portion in a position facing the inclined portion of said fixing member, and
    the protrusion is formed so that when the inclined portion of said fixing member presses the protrusion, said light guide plate moves closer to said light source substrate.

3. The planar light emitting device according to claim 1, wherein said second chassis is configured to cover a side end surface facing the side end surface of said light guide plate in parallel,
    said fixing member is inserted between a side end surface facing the side end surface of said light guide plate and said second chassis,
    said second chassis has an inclined portion inclined in the same direction as the inclined portion of said fixing member in a position facing the inclined portion,
    the inclined portion of said second chassis is formed so that when the inclined portion of said fixing member abuts against the inclined portion of said second chassis and a surface on the side opposite to the inclined portion of said fixing member presses said light guide plate, said light guide plate moves closer to said light source substrate.

4. The planar light emitting device according to claim 1, wherein in a side surface facing the side surface of said planar light emitting device, inclined portions inclined with respect to a longitudinal direction of the side end surface of said light guide plate are provided in corresponding positions on said light guide plate and said second chassis, and
    the inclined portions of said light guide plate and said second chassis are formed so that when said fixing member is pressed inside from outside said planar light emitting device, said light guide plate moves closer to said light source substrate.

5. A planar light emitting device comprising:
    a light guide plate having an upper surface and a lower surface facing each other;
    a reflective sheet placed on a lower surface of said light guide plate;
    a point light source having at least one light emitting element and provided so that light from the light emitting element enters into a side end surface of said light guide plate;
    a light source substrate mounted with said point light source and placed in parallel with the side end surface of said light guide plate;
    a first chassis that covers at least a back surface of said light source substrate and a lower surface of said light guide plate in parallel;
    a second chassis having an emission opening for planar emission placed in the upper surface of said light guide plate and mating with said first chassis;
    a light source substrate take-out portion provided in a side surface of said planar light emitting device for taking out said light source substrate along the side end surface of said light guide plate;
    a screw member provided in the side surface of said planar light emitting device and threaded into a threaded hole provided in said light guide plate through said second chassis; and
    inclined portions inclined with respect to a longitudinal direction of the side end surface of said light guide plate provided in corresponding positions on said light guide plate and said second chassis,
    wherein said inclined portions of said light guide plate and said second chassis are formed so that when said screw member is fastened in the threaded hole, said light guide plate is drawn toward said second chassis, said light guide plate moves closer to said light source substrate, and said light source substrate is held and fixed between the side end surface of said light guide plate and said first chassis; and so that when said screw member is loosened from the threaded hole, a gap is created between said light source substrate and the side end surface of said light guide plate or said first chassis, and said light source substrate can be taken out of said light source substrate take-out portion.

6. The planar light emitting device according to claim 5, wherein in a side surface facing the side surface of said planar light emitting device, inclined portions inclined with respect to the longitudinal direction of the side end surface of said light guide plate are provided in corresponding positions on said light guide plate and said second chassis, and said inclined portions of said light guide plate and said second chassis are formed so that when said light guide plate is drawn toward said screw member, said light guide plate moves closer to said light source substrate.

* * * * *